(12) United States Patent
Imai (10) Patent No.: US 8,899,596 B2
(45) Date of Patent: Dec. 2, 2014

(54) METAL GASKET

(75) Inventor: Toshihiro Imai, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 1592 days.

(21) Appl. No.: 11/797,689

(22) Filed: May 7, 2007

(65) Prior Publication Data

US 2007/0267822 A1 Nov. 22, 2007

(30) Foreign Application Priority Data

May 16, 2006 (JP) .................................. 2006-136113

(51) Int. Cl.
F02F 11/00 (2006.01)
F16J 15/08 (2006.01)

(52) U.S. Cl.
CPC ........ F16J 15/0825 (2013.01); *F16J 2015/085* (2013.01); *F16J 2015/0862* (2013.01)
USPC .............................................................. 277/593

(58) Field of Classification Search
USPC ....................... 277/591, 593, 594, 595, 598
See application file for complete search history.

(56) References Cited

U.S. PATENT DOCUMENTS

| | | | | |
|---|---|---|---|---|
| 3,519,281 A * | 7/1970 | Teucher et al. | ................ | 277/601 |
| 4,397,472 A * | 8/1983 | Czernik | .......... | 277/592 |
| 4,468,044 A * | 8/1984 | Ulmer et al. | .................. | 277/596 |
| 4,711,456 A * | 12/1987 | Udagawa | ....................... | 277/601 |
| 4,834,399 A * | 5/1989 | Udagawa et al. | ............. | 277/592 |
| 5,087,058 A * | 2/1992 | Miura et al. | .................. | 277/595 |
| 5,161,809 A * | 11/1992 | Matsushita et al. | ........... | 277/601 |
| 5,169,163 A * | 12/1992 | Udagawa et al. | ............. | 277/593 |
| 5,201,534 A * | 4/1993 | Miyaoh | ......................... | 277/595 |
| 5,277,434 A * | 1/1994 | Kestly et al. | .................. | 277/592 |
| 5,558,347 A * | 9/1996 | Nicholson | ..................... | 277/652 |
| 5,775,701 A * | 7/1998 | Martini | ......................... | 277/591 |
| 5,979,906 A * | 11/1999 | Silvian | ............................. | 277/593 |
| 6,168,167 B1* | 1/2001 | Aoki | ............................. | 277/595 |
| 6,315,303 B1* | 11/2001 | Erb et al. | ..................... | 277/593 |
| 6,378,876 B1* | 4/2002 | Matsushita | ................... | 277/593 |
| 6,422,572 B1* | 7/2002 | Ueda et al. | .................... | 277/591 |
| 6,431,554 B1* | 8/2002 | Miyamoto et al. | ............ | 277/593 |
| 6,565,098 B2* | 5/2003 | Bleyh | ............................. | 277/592 |
| 6,676,133 B2* | 1/2004 | Obermaier et al. | ........... | 277/593 |
| 6,676,134 B1* | 1/2004 | Wiegert et al. | ................ | 277/593 |
| 6,719,301 B2* | 4/2004 | Chen et al. | .................... | 277/601 |
| 6,722,662 B2* | 4/2004 | Heilig et al. | .................. | 277/600 |
| 6,994,353 B2 | 2/2006 | Kinoshita | | |
| 7,000,924 B2* | 2/2006 | Hohe et al. | .................... | 277/593 |
| 7,290,770 B2* | 11/2007 | Kasuya | ......................... | 277/592 |
| 7,360,768 B2* | 4/2008 | Watanabe et al. | ............. | 277/592 |
| 2003/0168818 A1* | 9/2003 | Pepin | ............................ | 277/593 |
| 2004/0160017 A1* | 8/2004 | Diez et al. | ..................... | 277/593 |

(Continued)

FOREIGN PATENT DOCUMENTS

DE 198 09 755 A1 9/1999

*Primary Examiner* — Kristina Fulton
(74) *Attorney, Agent, or Firm* — Manabu Kanesaka (57) ABSTRACT

A metal gasket includes first and second metal plates laminated together to form the metal gasket, and having holes to be sealed. At least one of the first and second metal plates has a half bead surrounding the hole. A surface pressure assistance plate is located at least adjacent to the half bead between the first and second metal plates. The assistance plate has depressions and projections with respect to a thickness direction thereof in at least a peripheral part thereof.

16 Claims, 6 Drawing Sheets

(56) References Cited

U.S. PATENT DOCUMENTS

| | | | |
|---|---|---|---|
| 2005/0179210 A1* | 8/2005 | Sueda | 277/592 |
| 2006/0097459 A1* | 5/2006 | Hohe et al. | 277/593 |
| 2006/0163819 A1* | 7/2006 | Kasuya | 277/593 |
| 2007/0090607 A1* | 4/2007 | Ueta et al. | 277/593 |
| 2007/0262536 A1* | 11/2007 | Werz et al. | 277/593 |
| 2007/0267822 A1* | 11/2007 | Imai | 277/593 |
| 2008/0023922 A1* | 1/2008 | Umehara | 277/592 |
| 2008/0197579 A1* | 8/2008 | Imai | 277/593 |

\* cited by examiner

Fig. 24 ic
METAL GASKET

BACKGROUND OF THE INVENTION AND RELATED ART STATEMENT

The present invention relates to a metal gasket such as a gasket for an exhaust manifold for an engine, or a cylinder head gasket.

When a joint surface between an exhaust manifold and an exhaust pipe for an automobile engine, or a joint surface between a cylinder head and a cylinder block (cylinder body) is sealed, a metal gasket is clamped between these members to seal combustion gas, coolant water, and lubrication oil.

Such a metal gasket is made by a design method, in which, mainly as sealing means, a full bead with a projected cross-section and a half bead with a step-like (crank-like) cross-section are arranged near the perimeter of a seal target hole. Among them, the half bead can be produced at a low cost, and easily sealed by a small fastening force, so that it is widely used for gasoline engines with a small fastening force compared to diesel engines.

With respect to the metal gasket with this half bead, there is a case in which a straight line portion is created in the gasket for the exhaust manifold when the gasket is seen in plan depending on the shape of an attached member. This straight line portion has proven to cause a problem such as water leakage or oil leakage during engine operation as compared to a curved line portion. It is commonly believed that the reason the straight line portion easily creates the above-mentioned problem is that a creep relaxation in the straight line portion of the half bead increases during the operation of an engine wherein the gasket is equipped, so that the seal surface pressure partially decreases.

Therefore, when the half bead forms a straight line in a plan view, if the straight line part extends, the half bead has less resistance to a compressive force compared to the full bead. Accordingly, the creep relaxation is generated in this half bead, so that the seal quality cannot be fully exerted.

For one solution for the above-mentioned problem, metal gaskets, such as those shown in Japanese Patent Publication No. 2004-92475, are formed by arranging a pair of half beads symmetrically in a thickness direction around a liquid hole which is formed substantially in a square or a rectangular shape. Also, outlines of corner parts of the half beads are formed in a shape with a radius which is larger than that of a corner part of the liquid hole. As a whole, the metal gaskets have a shape extending in a smooth circular shape. However, in order to form this kind of half beads, a space is required around the liquid hole (seal target hole), so that they are not practical.

On the other hand, even in the cylinder head gasket, as the weight and size of an engine have been reduced, an engine member tends to have a lower rigidity, and the deformation volume of the cylinder head which repeatedly occurs by engine operation has increased. Accordingly, a force compressing the half bead also increases, so that the serious problem is a creep relaxation of the half bead.

In addition, in the metal gaskets, the tightening pressure differs depending on the distance from the tightening bolt bore, so that the seal surface pressure generated in the half beads is also uneven. As a result, the creep relaxation occurs sporadically.

In view of the problems described above, the present invention has been made such that the metal gasket prevents the creep relaxation in the half bead formed around the seal target bore of the metal gasket. Also, the metal gasket widens the distribution of the surface pressure generated in the half bead and prevents a scratch in the member clamping the metal gasket, hereby securing an excellent seal quality.

Further objects and advantages of the invention will be apparent from the following description of the invention.

SUMMARY OF THE INVENTION

In order to achieve the objects described above, according to the present invention, a metal gasket includes a seal target bore and a half bead surrounding the seal target bore. The metal gasket is provided with a surface pressure assistance plate forming depressions and projections with respect to a thickness direction inside the half bead, all around the half bead or in a part of the perimeter of the half bead. The depressions and the projections are only required relative to at least one side of the standard line of a plate of the surface pressure assistance plate, and are not necessarily required relative to both sides.

According to the structure, the surface pressure assistance plate forming the depressions and the projections is arranged with respect to the thickness direction, so that compressibility of the half bead can be enhanced due to an elastic effect by the depressions and the projections of the surface pressure assistance plate, and creep relaxation of the half bead can be prevented.

Also, members disposed on both sides of the metal gasket and abutting against the half bead hit a corner part of the half bead from an area close to a narrow line to an area of a wide surface. In addition, the maximum value of the surface pressure can be decreased and the surface pressure can be reduced, and the surface pressure generated on the half bead, especially, the surface pressure generated at the corner part of the half bead can be reduced. Accordingly, a scratch in a member clamping the metal gasket can be prevented and an excellent seal quality can be secured.

Also, in the metal gasket, the direction of top parts of the depressions and the projections of the surface pressure assistance plate is a direction intersecting with the half bead all around the half bead or a part of the perimeter of the half bead. With such a structure, the elastic effect due to the depressions and the projections of the surface pressure assistance plate can be used more efficiently than the structure in which the direction of the top parts of the depressions and the projections is arranged parallel to the half bead.

The depressions and the projections of the surface pressure assistance plate may be formed as a straight line such as a trapezoid, or formed as a curved line such as a circular shape or a sine shape. Also, the depressions and the projections may be formed as one step or multiple steps, and may or may not be line-symmetric with respect to the thickness direction. In addition, with respect to the perimeter direction of the seal target bore, the depressions and the projections may be formed in a continuous wave pattern and provided all around the seal target bore, or may be formed only in a part wherein a surface pressure adjustment is required. Also, shapes and sizes of the depressions and the projections may also be changed in the perimeter direction of the seal target bore according to the degree of the surface pressure adjustment. Moreover, the surface pressure adjustment plate itself may be disposed all around the seal target bore, or may be disposed only in a part wherein the surface pressure adjustment is required.

Detailed structures of the half bead part of the metal gasket are as follows. In the first structure, a first metal plate and a second metal plate which respectively form the half beads surrounding the seal target bore and expanding outside in a direction away from the seal target bore, are symmetrically disposed, and clamp a middle plate inside flat parts on the inner perimeter side (seal target bore side of half beads). Also, a surface pressure assistance plate, forming the depressions and the projections with respect to the thickness direction, is disposed on the outer perimeter side of the middle plate and inside the half beads between sloping parts of the half beads and flat parts on the outer perimeter side of the sloping parts. In the second structure, the middle plate and the surface pressure assistance plate are formed by the same plate of the first structure. In the third structure, the middle plate is eliminated, and the flat parts on the inner perimeter sides of the half beads of the first metal plate and the second metal plate are abutted against each other in the first structure.

In the fourth structure, the first metal plate forming the half bead surrounding the seal target bore and expanding outside in the direction away from the seal target bore; the middle plate disposed inside the flat part on the inner perimeter side of the half bead; the surface pressure assistance plate forming the depressions and the projections which are disposed on the outer perimeter side and inside the half bead between the sloping part of the half bead and the flat part on the outer perimeter side of the sloping part; and the flat second metal plate, are laminated. In the fifth structure, the middle plate and the surface pressure assistance plate are formed by the same plate in the fourth structure.

Moreover, instead of disposing the surface pressure assistance plate between the sloping part and the flat part of the half bead, the surface pressure assistance plate may be disposed on the outer perimeter side of the sloping part and inside the flat part on the outer perimeter side of the half bead. In this case, the surface pressure moderation effect on the corner part of the half bead is somewhat little. However, the elasticity of the half bead can be increased by the elasticity of the surface pressure assistance plate, so that it is expected that the creep relaxation be prevented.

Also, a metal gasket in which the present invention can be applied includes a metal gasket such as a gasket for an exhaust manifold for an engine, or a cylinder head gasket. These metal gaskets can have the above-mentioned large effect. However, the metal gasket is not limited to the above-mentioned gaskets, and may only be a metal gasket sealing the seal target bore.

According to the metal gasket of the present invention, the creep relaxation in the half bead around the seal target bore of the metal gasket can be prevented, and a scratch of a member clamping the metal gasket can be prevented by widening the distribution of the surface pressure generated in the half bead, so that an excellent seal quality can be secured.

DETAILED DESCRIPTION OF PREFERRED EMBODIMENTS

Hereunder, a metal gasket according to embodiments of the present invention will be explained with reference to the attached drawings.

Incidentally, FIGS. 1-24 are schematic explanatory views in which sizes of a seal target bore, bolt holes and half beads; widths of a middle plate and a surface pressure assistance plate; and thicknesses of a metal plate, middle plate and the surface pressure assistance plate; and sizes of depressions and projections are different from actual ones and enlarged for the sake of explanation. Also, for the sake of simplicity, hereunder, the seal target bore will be explained as one seal target bore. However, the present invention can be applied even when multiple kinds of seal target bores such as gas circulation holes, combustion chamber holes (bore holes), water holes, or oil holes, are respectively provided with multiple numbers, such as a gasket for an exhaust manifold for a multiple cylinder engine or a cylinder head gasket. Incidentally, the following "outside" and "inside" are terms with respect to a thickness direction of the gasket, and the horizontal direction of the gasket is described as an "outer perimeter side" and an "inner perimeter side".

Figure 1:
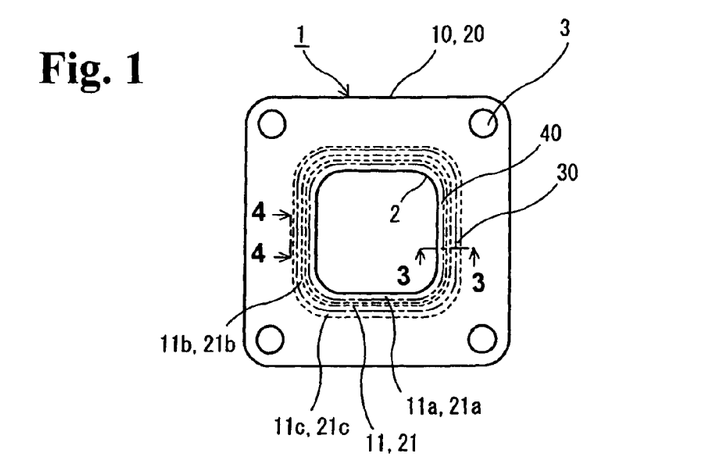
FIG. 1 is a schematic plan view of a metal gasket according to an embodiment of the present invention.

As shown in FIG. 1, the metal gasket 1 of the embodiments of the present invention is formed of multiple metal plates (metal composition plates) made of soft steel, annealed stainless (annealed material), or stainless material (spring steel). Also, the metal gasket 1 is produced in a shape corresponding to the shape of a member clamping the metal gasket 1, and is provided with a seal target bore 2 and bolt holes 3 for inserting tightening bolts.

In the first embodiment shown in FIGS. 1-5, this metal gasket 1 has a first metal plate 10 and a second metal plate 20 arranged symmetrically, which clamp a middle plate 40. Also, a surface pressure assistance plate 30 forming depressions and projections with respect to a thickness direction of the metal gasket 1, is disposed on the outer perimeter side of the middle plate 40, and inside between sloping parts 11b, 21b of half beads 11, 21 and flat parts 11c, 21c on the outer perimeter side. More specifically, an inner perimeter side end of the surface pressure assistance plate 30 is disposed inside the sloping parts 11b, 21b.

For example, the first metal plate 10 and the second metal plate 20 are made of soft steel or annealed stainless (annealed material), and provided with the seal target bore 2 and the bolt holes 3 surrounding the seal target bore 2. Also, the first metal plate 10 and the second metal plate 20 respectively provide the half beads 11, 21 surrounding the seal target bore 2 and extending outside with respect to the thickness direction of the gasket in a direction away from the seal target bore 2. Also, the first metal plate 10 and the second metal plate 20 are symmetrically disposed clamping the middle plate 40.

Figure 2:
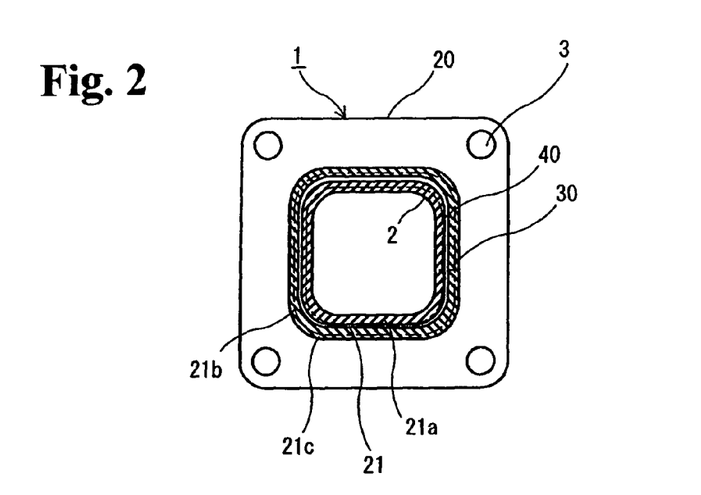
FIG. 2 is a schematic plan view showing a state without a first metal plate in FIG. 1 of the metal gasket according to the first embodiment.
Figure 3:
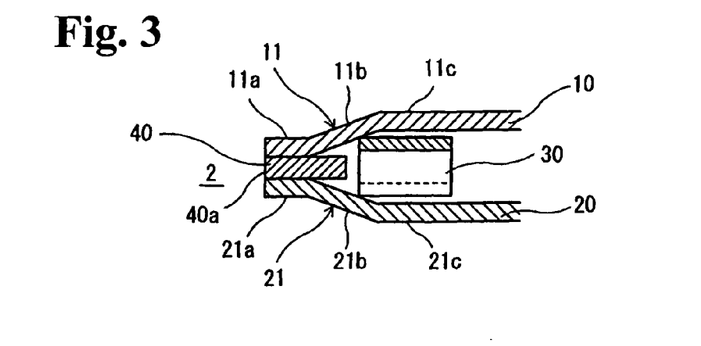
FIG. 3 is a schematic sectional view taken along line 3-3 in FIG. 1 of the metal gasket according to the first embodiment.

The middle plate 40 is made of soft steel, annealed stainless (annealed material), or stainless material (spring steel), and as shown in FIG. 2, disposed in a ring shape (circularity) around the seal target bore 2. As shown in FIG. 3, an inner perimeter side end 40a facing the seal target bore 2 is arranged inside flat parts 11a, 21a on the inner perimeter side (seal target bore 2 side) of the half beads 11, 21. The middle plate 40 prevents liquid from entering between the half beads 11, 21 and adjusts a thickness. Therefore, the middle plate 40 is formed in a sheet of ring-shaped continuous plate in a circumferential direction.

Figure 4:
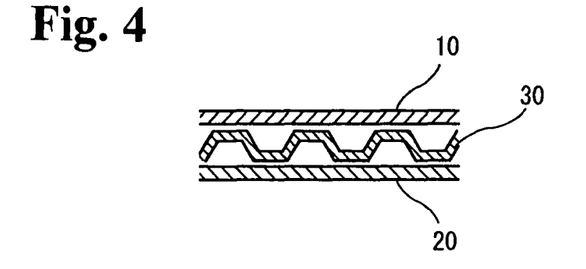
FIG. 4 is a schematic sectional view taken along line 4-4 in FIG. 1 of the metal gasket according to the first embodiment.
Figure 5:
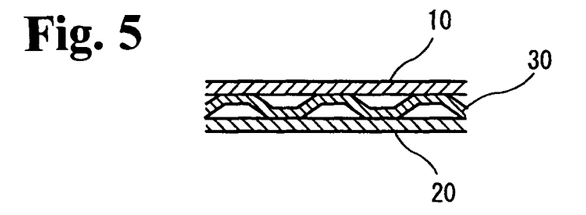
FIG. 5 is a schematic sectional view similar to FIG. 4 when the metal gasket is compressed.

As shown in FIG. 2, the surface pressure assistance plate 30 is disposed in a ring shape, and as shown in FIGS. 4, 5, forms the depressions and the projections with respect to the thickness direction. The surface pressure assistance plate 30 has elasticity relative to a compressive direction of the half beads 11, 21 of the metal gasket 1. When the half beads 11, 21 are compressed, as shown in FIG. 5, the surface pressure assistance plate 30 abuts against the sloping parts 11b, 21b of the half beads 11, 21, and provides a cushion effect, thereby adjusting the surface pressure of the half beads 11, 21.

Figure 16:
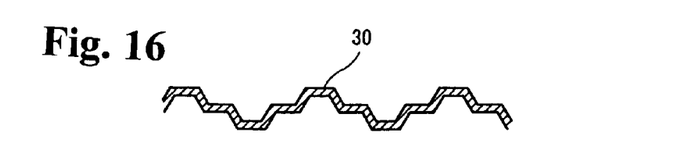
FIG. 16 is a schematic view of a second example of the depressions and the projections of the surface pressure adjustment plate.
Figure 17:
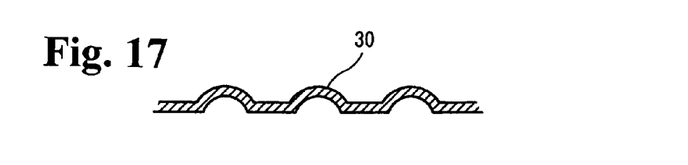
FIG. 17 is a schematic view of a third example of the depressions and the projections of the surface pressure adjustment plate.
Figure 18:
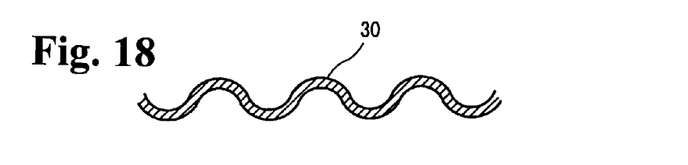
FIG. 18 is a schematic view of a fourth example of the depressions and the projections of the surface pressure adjustment plate.
Figure 19:
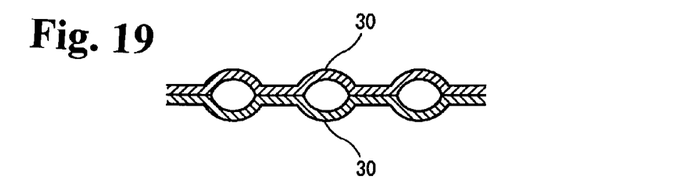
FIG. 19 is a schematic view of a fifth example of the depressions and the projections of the surface pressure adjustment plate.
Figure 20:
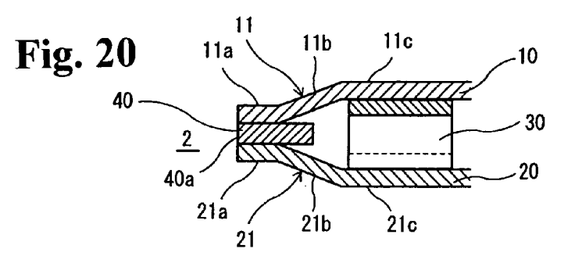
FIG. 20 is a schematic sectional view, similar to FIG. 3, of the metal gasket according to the first embodiment with a different position of the surface pressure adjustment plate.
Figure 21:
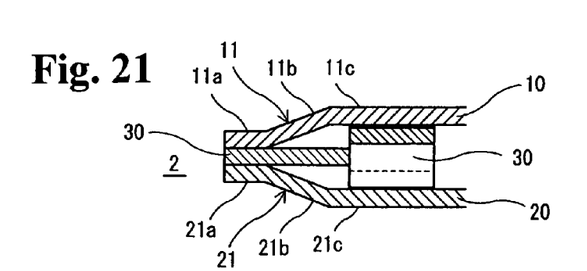
FIG. 21 is a schematic sectional view, similar to FIG. 3, of the metal gasket according to the second embodiment with the different position of the surface pressure adjustment plate.
Figure 22:
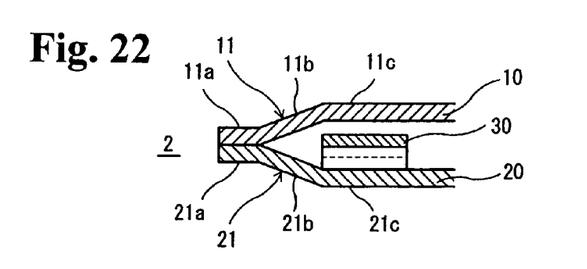
FIG. 22 is a schematic sectional view, similar to FIG. 3, of the metal gasket according to the third embodiment with the different position of the surface pressure adjustment plate.
Figure 23:
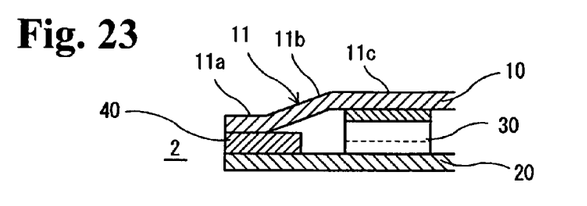
FIG. 23 is a schematic sectional view, similar to FIG. 3, of the metal gasket according to the fourth embodiment with the different position of the surface pressure adjustment plate.
Figure 24:
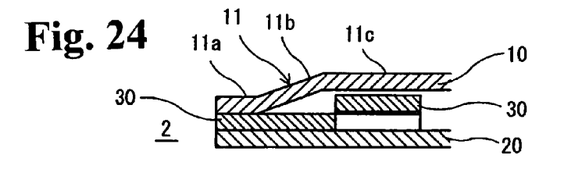
FIG. 24 is a schematic sectional view, similar to FIG. 3, of the metal gasket according to the fifth embodiment with the different position of the surface pressure adjustment plate.

The surface pressure assistance plate 30 is made of stainless material (spring steel) and the like, and as shown in FIGS. 4, 12, 15, 16, the depressions and the projections may be formed with straight lines such as a trapezoid. However, as shown in FIGS. 9, 14, 17, 18, 19, the depressions and the projections may be formed with curved lines such as a circular shape or a sine shape. In addition, as shown in FIGS. 4, 5, 9, 12, 14, 15, 17, 18, the depressions and the projections may be formed by a single step, or as shown in FIGS. 16, 19, formed by multiple steps. Moreover, the depressions and the projections may or may not be axisymmetric with respect to the thickness direction.

Also, with respect to the perimeter direction of the seal target bore 2, the depressions and the projections may be formed in a continuous wave pattern and provided all around the seal target bore 2, or may be formed in a continuous wave pattern; a single projection; or a single depression, and the depressions and the projections may be formed in only a part wherein a surface pressure adjustment is required. Also, shapes and sizes of the depressions and the projections may also be changed according to the degree of the surface pressure adjustment. Moreover, the surface pressure assistance plate 30 itself may be disposed all around the seal target bore 2, or may be disposed only in the part wherein the surface pressure adjustment is required. Basically, the depressions and the projections need only to have appropriate elasticity relative to the compressive direction of the metal gasket not to cause creep relaxation. The depressions and the projections can be easily formed by a pressing process and the like.

Figure 6:
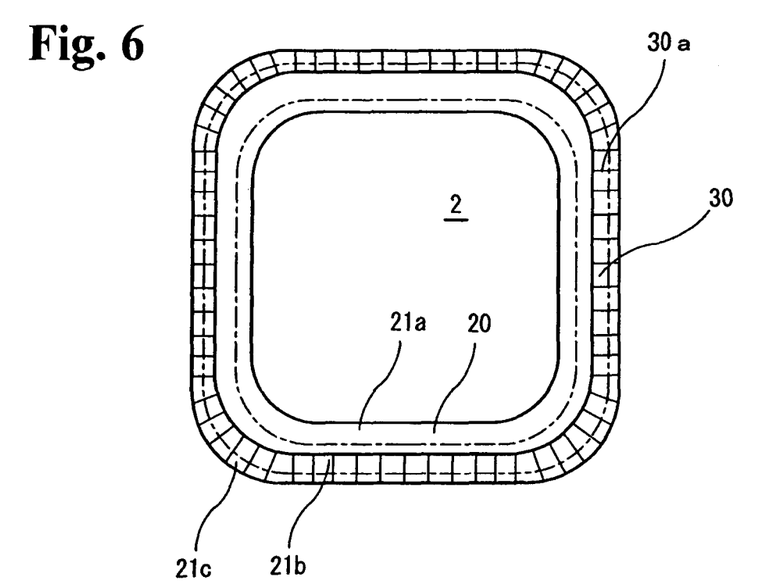
FIG. 6 is a schematic plan view showing an example of a direction of top parts of depressions and projections of a surface pressure assistance plate.

Also, as shown in FIG. 6, the direction of top parts 30a of the depressions and the projections of the surface pressure assistance plate 30 is a direction intersecting with the half beads 11, 21, preferably, 80-100°, more preferably, 90° (perpendicular), so that an elastic effect by the depressions and the projections of the surface pressure assistance plate 30 can be used more efficiently compared to the case of arranging the top parts of the depressions and the projections parallel to the half beads 11, 21. Also, when the top parts of the depressions and the projections are arranged in the intersecting direction, very narrow (linear) hit of corner parts of the half beads 11, 21 can be made wide (planar) hit by abutting the depressions and the projections of the surface pressure assistance plate 30 against the slop parts 11b, 21b of the half beads 11, 21, so that the local surface pressure can be decreased. As a result, an abutting part in a member in which the half beads 11, 21 abut, can be prevented from being scratched.

Figure 7:
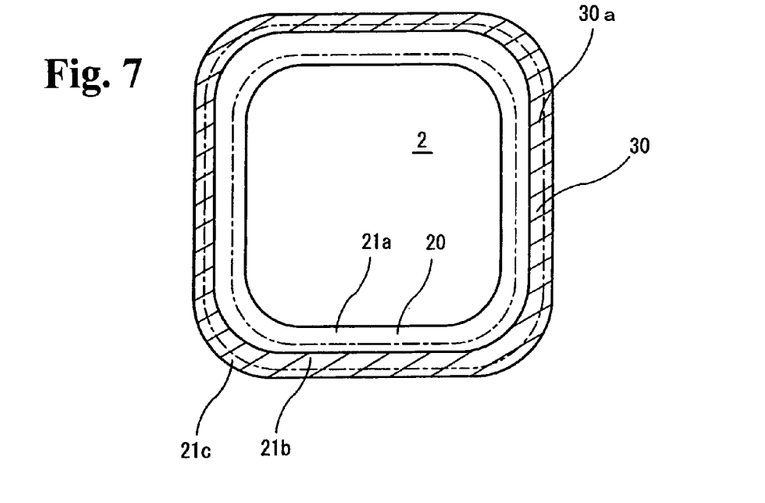
FIG. 7 is a schematic plan view of another example of a direction of the top parts of the depressions and the projections of the surface pressure assistance plate.

Incidentally, as shown in FIG. 7, in the surface pressure assistance plate 30, when the direction of the top parts 30a of the depressions and the projections is made in one direction, an evenly spread surface pressure cannot be achieved as compared to the case wherein the top parts 30a of the depressions and the projections are arranged in the direction intersecting with the half beads 11, 21. However, in this case, since the depressions and the projections are simplified, they can be produced more easily.

With respect to the arrangement of the intersecting direction, the surface pressure adjustment changes even by an intersecting angle, so that if the intersecting angle is changed by a required compressive elasticity (spring force), a precise surface pressure adjustment can be achieved. More specifically, in a part of perimeters of the half beads 11, 21, or all around the half beads 11, 21, the direction of the top parts of the depressions and the projections of the surface pressure assistance plate 30 is the direction intersecting with the half beads 11, 21. When the direction of the top parts of the depressions and the projections of the surface pressure assistance plate 30 is the direction intersecting with the half beads 11, 21 all around the half beads 11, 21, for example, when the seal target bore 2 is a circle, the top parts (valleys and mountains) of the depressions and the projections are arranged radially.

Also, the surface pressure assistance plate 30 may be formed as a continuous ring in a perimeter direction of the seal target bore 2. However, since the function is to adjust the surface pressure, the surface pressure assistance plate 30 does not necessarily need to be provided in a continuous integral part all around the perimeter direction, and divided multiple layers of surface pressure assistance plates 30 may be arranged to contact each other, or may be disposed separately only in parts wherein the surface pressure adjustment is required. More specifically, in the part of the perimeter of the half beads 11, 21 or all around the half beads 11, 21, the surface pressure assistance plates 30 forming the depressions and the projections with respect to the thickness direction are disposed inside the half beads 11, 21.

According to the structure, the degree of the surface pressure adjustment can be changed with or without the surface pressure assistance plate 30, by changes of shape and size (height, width and so on) of the depressions and the projections, a length of the top parts of the depressions and the projections (width of the surface pressure assistance plate 30), or an intersecting angle between the direction of the top parts of the depressions and the projections and the half beads 11, 21. Accordingly, the surface pressure can be easily adjusted very precisely.

Figure 8:
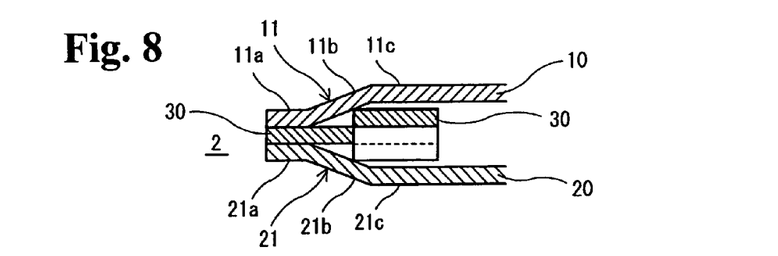
FIG. 8 is a schematic sectional view, similar to FIG. 3, of the metal gasket according to the second embodiment.
Figure 9:
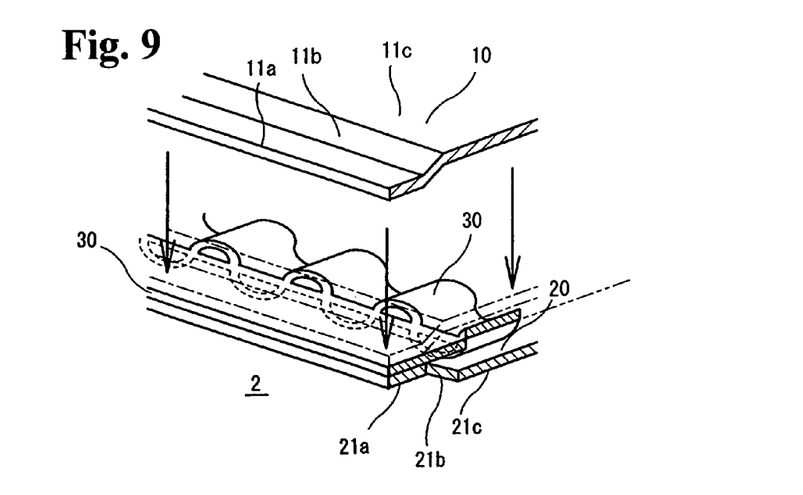
FIG. 9 is a schematic fragmentary perspective view of the metal gasket according to the second embodiment.

As shown in FIGS. 8, 9, the metal gasket according to the second embodiment of the invention differs from the metal gasket according to the first embodiment, because the middle plate 40 and the surface pressure assistance plate 30 are formed in one sheet of surface pressure assistance plate 30. The other structure of the metal gasket of the second embodiment is the same as that of the metal gasket of the first embodiment. Incidentally, as shown in FIG. 9, the surface pressure assistance plate 30 is made to be flat on the inner perimeter side, and forms curved depressions and projections on the outer perimeter side.

In the second embodiment, the same plate has both functions of the middle plate 40 which is required for a sealing effect and the surface pressure assistance plate 30 which is required for an elastic effect. Accordingly, a material cannot be used separately. However, the second embodiment can be produced more easily compared to the first embodiment because the middle plate 40 is eliminated and a width of the surface pressure assistance plate 30 increases.

Figure 10:
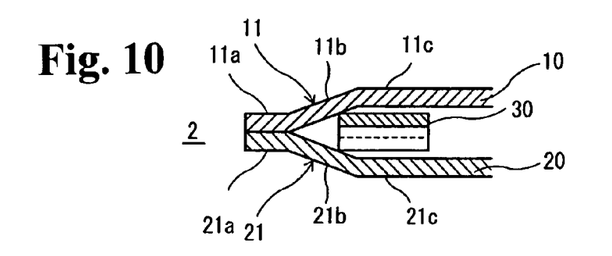
FIG. 10 is a schematic sectional view, similar to FIG. 3, of the metal gasket according to the third embodiment.

As shown in FIG. 10, the metal gasket according to the third embodiment of the invention differs from the metal gasket according to the first embodiment because the middle plate 40 is eliminated. The other structure of the third embodiment is the same as that of the metal gasket of the first embodiment. Due to such a structure, the seal quality cannot be improved by the middle plate 40. However, the metal gasket of the third embodiment can reduce the weight and size, and be produced more easily than the metal gasket of the first embodiment.

Figure 11:
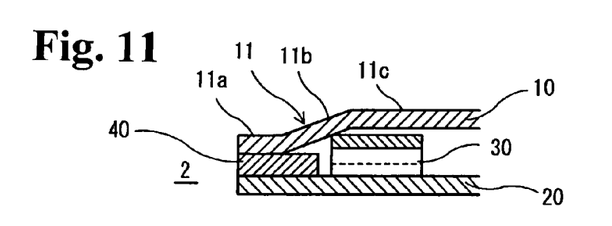
FIG. 11 is a schematic sectional view, similar to FIG. 3, of the metal gasket according to the fourth embodiment.
Figure 12:
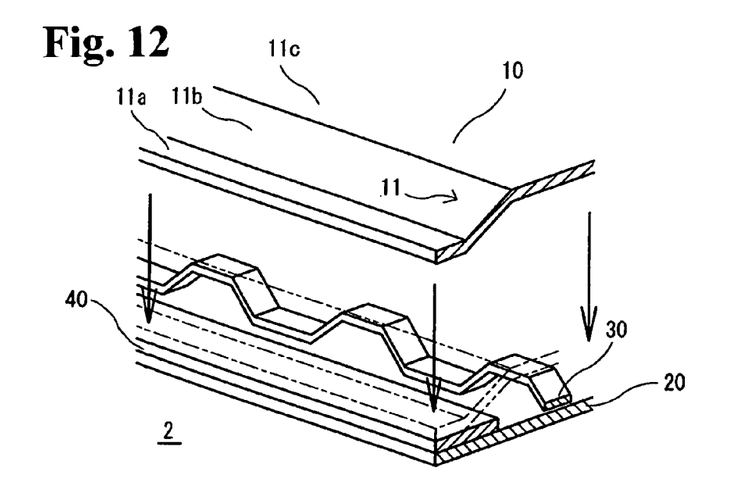
FIG. 12 is a schematic fragmentary perspective view of the metal gasket according to the fourth embodiment.

As shown in FIGS. 11, 12, the metal gasket according to the fourth embodiment of the invention laminates the first metal plate 10, forming the half bead 11 surrounding the seal target bore 2 and expanding outside in the direction away from the seal target bore 2; the middle plate 40 disposed on the inner perimeter side of the half bead 11, i.e., inside the flat part 11a on the seal target bore 2 side; the surface pressure assistance plate 30 forming the depressions and the projections and disposed on the outer perimeter side and inside the half bead 11 between the sloping part 11b of the half bead 11 and the flat part 11c on the outer perimeter side; and the flat second metal plate 20. The metal gasket of the fourth embodiment differs from the metal gasket of the first embodiment, because the half bead 21 is not formed on the second metal plate 20.

The metal gasket of the fourth embodiment is suitable for the case in which a compressive transformation quantity due to the bead is small as compared to the metal gasket of the first embodiment, thereby saving materials and reducing the weight and size. Also, the thickness of the gasket can be reduced.

Figure 13:
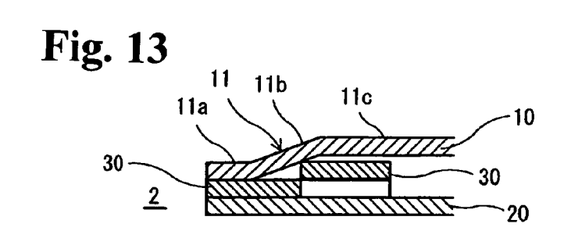
FIG. 13 is a schematic sectional view, similar to FIG. 3, of the metal gasket according to the fifth embodiment.
Figure 14:
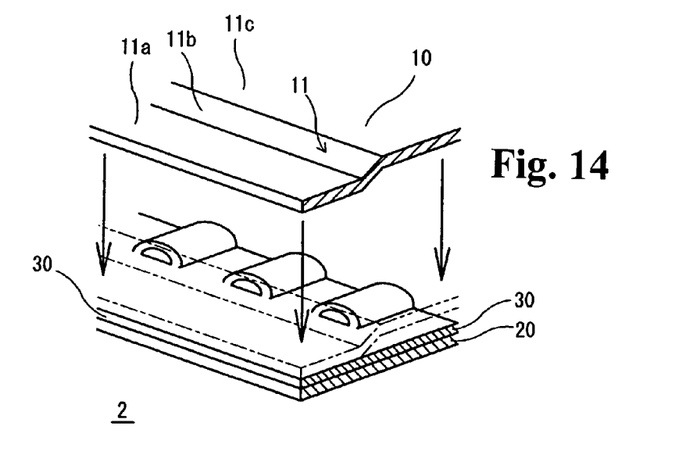
FIG. 14 is a schematic fragmentary perspective view of the metal gasket according to the fifth embodiment.
Figure 15:
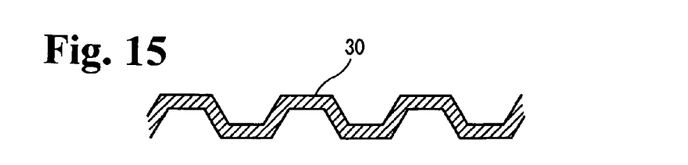
FIG. 15 is a schematic view of a first example of depressions and projections of a surface pressure adjustment plate.

As shown in FIGS. 13, 14, the metal gasket according to the fifth embodiment differs from the metal gasket according to the fourth embodiment, because the middle plate 40 and the surface pressure assistance plate 30 are formed by one sheet of surface pressure assistance plate 30. The other structure of the metal gasket of the fifth embodiment is the same as that of the metal gasket of the fourth embodiment. Incidentally, in FIG. 14, the depressions and the projections of the surface pressure assistance plate 30 are made to be flat on the inner perimeter side, and have curved projections only on one side of the half bead 11 side on the outer perimeter side.

Also, in FIGS. 20-24, in the metal gasket according to the first-fifth embodiments, instead of disposing the surface pressure assistance plate 30 inside between the sloping part 11b (21b) of the half bead 11 (21) and the flat part 11c (21c) on the outer perimeter side, the surface pressure assistance plate 30 is disposed inside the flat part 11c (21c) on the outer perimeter side of the half bead 11 (21). In this case, the surface pressure moderation effect on the corner part of the half bead 11 (21) is a little. However, the elasticity of the half bead 11 (21) can be enhanced by the elasticity of the surface pressure assistance plate 30, so that a creep relaxation of the half bead 11 (21) can be prevented.

According to the metal gasket 1 with the above-mentioned structure, the surface pressure assistance plate 30 forming the depressions and the projections is disposed with respect to the thickness direction, so that a creep relaxation of the half bead can be prevented by using the elastic effect due to the depressions and the projections of the surface pressure assistance plate 30. Also, the surface pressure generated in the half bead 11 (21), especially, a force generated in the corner part of the half bead 11 (21) can be eased, so that the member clamping the metal gasket 1 can be prevented from being scratched, thereby securing an excellent seal quality.

The disclosure of Japanese Patent Application No. 2006-136113, filed on May 16, 2006, is incorporated in the application.

While the invention has been explained with reference to the specific embodiments of the invention, the explanation is illustrative and the invention is limited only by the appended claims.

What is claimed is:

1. A metal gasket comprising:
    first and second metal plates laminated together to form the metal gasket, each of said first and second metal plates having an outer edge, a hole to be sealed and an inner edge for defining the hole, at least one of the first and second metal plates having a half bead surrounding the hole, and
    a surface pressure assistance plate located at least adjacent to the half bead between the first and second metal plates, said assistance plate having depressions and projections with respect to a thickness direction thereof, said assistance plate having a ring shape surrounding the hole to be sealed and being located away from the outer edges of the first and second metal plates without extending throughout entire areas of the first and second metal plates.

2. A metal gasket according to claim 1, wherein said depressions and projections of the assistance plate have top portions extending in a direction intersecting with the half bead and are located only at portions away from the inner edges of the first and second metal plates.

3. A metal gasket according to claim 2, wherein said depressions and projections in the assistance plate are formed alternately continuously all around the peripheral part thereof.

4. A metal gasket comprising:

first and second metal plates laminated together to form the metal gasket, each of said first and second metal plates having an outer edge, a hole to be sealed and an inner edge for defining the hole, at least one of the first and second metal plates having a half bead surrounding the hole, and a surface pressure assistance plate located at least adjacent to the half bead between the first and second metal plates, said assistance plate having depressions and projections with respect to a thickness direction thereof, said assistance plate having a ring shape surrounding the hole to be sealed and being located away from the outer edges of the first and second metal plates without extending throughout entire areas of the first and second metal plates, wherein said depressions and projections of the assistance plate have top portions extending in a direction intersecting with the half bead and are located only at portions away from the inner edges of the first and second metal plates, and wherein said first metal plate includes an inner flat portion and an outer flat portion with respect to the hole, said half bead being formed between the inner and outer flat portions to be inclined thereto, said depressions and projections being located outside the inner flat portion and under the outer flat portion outside the half bead.

5. A metal gasket according to claim 4, wherein said assistance plate is located only under the outer flat portion.

6. A metal gasket according to claim 5, wherein said second metal plate is a flat plate without a half bead.

7. A metal gasket according to claim 4, wherein said assistance plate is arranged to extend both the half bead and the outer flat portion.

8. A metal gasket according to claim 7, wherein said second metal plate includes an inner flat portion and an outer flat portion with the half bead therebetween, said inner and outer flat portions of the second metal plate being arranged symmetrically with respect to those of the first metal plate.

9. A metal gasket according to claim 8, wherein said assistance plate is arranged to extend both the half bead and the outer flat portion of the second metal plate.

10. A metal gasket according to claim 2, further comprising a middle plate in a ring shape disposed inside the assistance plate.

11. A metal gasket according to claim 10, wherein said middle plate is formed separately from the assistance plate.

12. A metal gasket according to claim 10, wherein said middle plate is formed integrally with the assistance plate.

13. A metal gasket according to claim 9, further comprising a middle plate in a ring shape disposed between the inner flat portions of the first and second metal plates, said middle plate being formed separately from the assistance plate.

14. A metal gasket according to claim 9, further comprising a middle plate in a ring shape disposed between the inner flat portions of the first and second metal plates, said middle plate being formed integrally with the assistance plate.

15. A metal gasket according to claim 1, wherein said assistance plate is located away from the inner edge of the first and second metal plates.

16. A metal gasket according to claim 15, wherein each of said depressions and projections in the assistance plate extends throughout an entire width of the assistance plate, said depressions and projections being formed alternately continuously all around the peripheral part thereof.

* * * * *